United States Patent
Benner et al.

(10) Patent No.: US 10,330,032 B2
(45) Date of Patent: Jun. 25, 2019

(54) ENGINE AND CONTROL STRATEGY FOR INJECTING AUGMENTING FUEL TO STREAM OF GASEOUS FUEL AND AIR

(71) Applicant: Caterpillar Inc., Peoria, IL (US)

(72) Inventors: Morgen Benner, Lafayette, IN (US); Dennis Walling, Lafayette, IN (US)

(73) Assignee: Caterpillar Inc., Deerfield, IL (US)

( * ) Notice: Subject to any disclaimer, the term of this patent is extended or adjusted under 35 U.S.C. 154(b) by 79 days.

(21) Appl. No.: 15/463,519

(22) Filed: Mar. 20, 2017

(65) Prior Publication Data

US 2018/0266355 A1 Sep. 20, 2018

(51) Int. Cl.

| F02D 41/00 | (2006.01) |
|---|---|
| F02M 21/02 | (2006.01) |
| F02D 19/02 | (2006.01) |
| F02B 5/00 | (2006.01) |
| F02B 15/00 | (2006.01) |
| F02B 43/00 | (2006.01) |

(52) U.S. Cl.
CPC ............ *F02D 41/0027* (2013.01); *F02B 5/00* (2013.01); *F02B 15/00* (2013.01); *F02B 43/00* (2013.01); *F02D 19/024* (2013.01); *F02D 19/029* (2013.01); *F02M 21/0215* (2013.01); *F02D 2200/0406* (2013.01); *F02D 2200/0414* (2013.01); *F02D 2200/0611* (2013.01); *F02D 2200/0614* (2013.01); *F02D 2200/101* (2013.01); *F02D 2200/1002* (2013.01); *Y02T 10/32* (2013.01); *Y02T 10/36* (2013.01)

(58) Field of Classification Search
CPC ............. F02D 41/3005; F02D 41/0027; F02D 2200/0614; F02D 2200/0611; F02B 5/00
See application file for complete search history.

(56) References Cited

U.S. PATENT DOCUMENTS

| 7,177,752 | B2 | 2/2007 | Herdin et al. |
|---|---|---|---|
| 7,708,943 | B1 | 5/2010 | Robinson et al. |
| 7,823,562 | B2 * | 11/2010 | Duineveld .......... F02D 19/0628 123/1 A |
| 8,636,024 | B2 | 1/2014 | Isetani |
| 9,133,779 | B2 | 9/2015 | Hughes |
| 2015/0345408 | A1 * | 12/2015 | Sivasubramanian ....... F02D 19/0607 123/445 |
| 2017/0089273 | A1 * | 3/2017 | Thomas ................ F02D 19/081 |
| 2018/0180493 | A1 * | 6/2018 | Ishiguro ................ G01N 25/20 |

* cited by examiner

*Primary Examiner* — Joseph J Dallo
*Assistant Examiner* — Kurt Philip Liethen
(74) *Attorney, Agent, or Firm* — Jonathan F. Yates

(57) ABSTRACT

A control system for a spark-ignited gaseous fuel engine includes a fuel quality sensing mechanism, and a control device structured to receive data produced by the fuel quality sensing mechanism indicative of a change in energy content of a stream of gaseous fuel and air, and to vary an amount of an augmenting fuel that is injected into the stream of gaseous fuel and air based on the data. The strategy has application to low energy gaseous fuel and air mixtures such as are produced in mine ventilation.

17 Claims, 3 Drawing Sheets

ENGINE AND CONTROL STRATEGY FOR INJECTING AUGMENTING FUEL TO STREAM OF GASEOUS FUEL AND AIR

TECHNICAL FIELD

The present disclosure relates generally to internal combustion engines and operating strategies for lower energy content gaseous fuels and fuel blends, and more particularly to controllably increasing an energy content of a gaseous fuel and air mixture with an augmenting fuel.

BACKGROUND

Gaseous fuel engines are used in a wide variety of applications, in contexts such as power generation, vehicle propulsion, gas compression, pumping, and still others. Operation on gaseous fuel offers a number of advantages, including a generally desirable and controllable emissions profile, particularly with respect to oxides of nitrogen or "NOx." Gaseous fuel engines are also generally well-suited to stoichiometrically lean operation, and gaseous fuels tend to be readily and economically available and transportable. Most gaseous fuel engines are also spark-ignited, enabling relatively precise control over the timing of ignition of a combustion charge in any given cylinder, which capability can be exploited to various ends.

Gaseous fuel engines are commonly deployed at sites such as oil field and gas field sites, landfills, drilling platforms, and some industrial sites, for example, generally due to the ready availability of gaseous fuels, notably natural gas, landfill gas, biogas, and various others including blends. In more recent years there has been interest in deployment of gaseous fuel engines at certain mine sites where naturally occurring natural gas is commonly found. At a coal mine, for example, a certain amount of natural gas will generally tend to reside within the mine, particularly at shaft mines, and is replenished by natural processes when depleted. While the relative abundance of natural gas in a shaft coal mine will typically be relatively low, it can nevertheless be desirable to vent the mine gas for various reasons. In many modern shaft coal mines, the mine gas is more or less continuously ventilated from the mine by forcing fresh air from the surface through the various shafts and passages of the mine.

The desirability of making use of the otherwise wasted natural gas in mine gas is readily apparent, however, the relative proportion of natural gas in mine gas tends to be lower than what most gaseous fuel engines are designed to operate on. The proportion of combustible gaseous fuel in mine gas may be as low as about 4% and typically no higher than about 12-15% depending on the particular mine and ventilation strategy. For this reason, the energy content of the mine gas tends to be relatively low and a substantial proportion of the total gas throughput of a gaseous fuel engine must be dedicated to conveyance of the mine gas if operation is even possible. For these and other reasons, to enable successful and practicable gaseous fuel engine operation on mine gas, expensive equipment may be required, and it still may not be practicable to operate such an engine at all given fluctuations in the relative proportion of combustible fuel in the mine gas stream.

Various strategies have been proposed before relating to blending gaseous fuels and blends to obtain desired properties, such as energy content. U.S. Pat. No. 9,133,779 to Hughes discloses a strategy for blending raw natural gas and methane gas. While the techniques disclosed in Hughes may be advantageous for certain types of off-spec gas or certain applications, there remains room for further innovation in the gaseous fuels and gaseous fuel engine fields.

SUMMARY OF THE INVENTION

In one aspect, an internal combustion engine system includes an engine housing having a combustion chamber formed therein, and a fluid conduit having an inlet for receiving a stream of gaseous fuel and air, and an outlet for conveying the stream of gaseous fuel and air to the combustion chamber. The engine system further includes a fuel supply, and an electronically controlled fuel valve positioned fluidly between the fluid conduit and the fuel supply to convey a flow of augmenting fuel from the fuel supply into the stream of gaseous fuel and air. The engine system further includes a fuel quality sensing mechanism structured to produce data indicative of an energy content of the stream of gaseous fuel and air, and a control device coupled with the electronically controlled fuel valve and with the fuel quality sensing mechanism. The control device is structured to actuate the electronically controlled fuel valve to form a combustion charge within the engine housing that contains the gaseous fuel, air, and an injected amount of the augmenting fuel that is dependent upon the energy content of the stream of gaseous fuel and air.

In another aspect, a fuel system for an internal combustion engine includes a fluid conduit having an inlet for receiving a stream of gaseous fuel and air, and an outlet structured to fluidly connect to a combustion chamber in the internal combustion engine. The fuel system further includes a fuel supply, and an electronically controlled fuel valve in fluid communication with the fuel supply and structured to inject an augmenting fuel from the fuel supply into the stream of gaseous fuel and air to form a combustion charge within the internal combustion engine. The fuel system further includes a fuel quality sensing mechanism and a control device coupled with the electronically controlled fuel valve and with the fuel quality sensing mechanism. The control device is structured to receive data produced by the fuel quality sensing mechanism that is indicative of a change in energy content of the stream of gaseous fuel and air from a first time to a second time, and to vary an amount of the augmenting fuel that is injected into the stream of gaseous fuel and air from the first time to the second time, based on the data indicative of a change in energy content.

In still another aspect, a control system for a spark-ignited gaseous fuel internal combustion engine system includes a fuel quality sensing mechanism structured to couple with a fluid conduit for conveying a stream containing gaseous fuel and air through the internal combustion engine, such that the fuel quality sensing mechanism is exposed to a flow of the stream of gaseous fuel and air. The control system further includes a control device coupled with the fuel quality sensing mechanism, and being structured to couple with a fuel valve for injecting an augmenting fuel into the stream of gaseous fuel and air to increase an energy content of the stream of gaseous fuel and air. The control device is structured to receive data produced by the fuel quality sensing mechanism that is indicative of a change in energy content of the stream of gaseous fuel and air from a first time to a second time, and to vary an amount of the augmenting fuel that is injected into the stream of gaseous fuel and air from the first time to the second time, based on the data indicative of a change in energy content.

DETAILED DESCRIPTION

Figure 1:
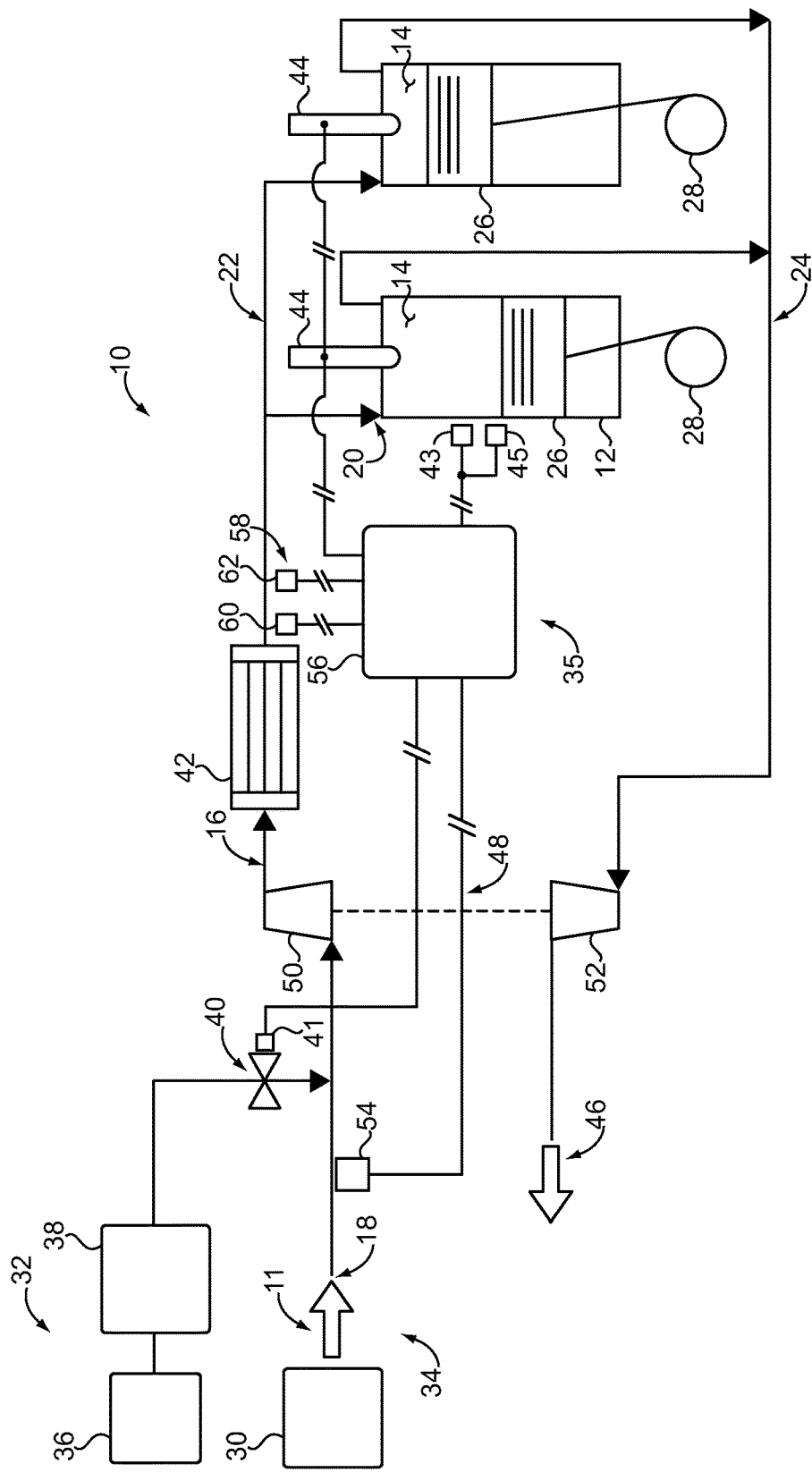
FIG. 1 is a diagrammatic view of an engine system, according to one embodiment.

Referring to FIG. 1, there is shown an internal combustion engine system 10, according to one embodiment, and including an engine housing 12 having a combustion chamber 14 formed therein. Engine housing 12 includes a fluid conduit 16 having an inlet 18 for receiving a stream of gaseous fuel and air. Fluid conduit 16 further includes an outlet 20 for conveying the stream of gaseous fuel and air to combustion chamber 14. In the illustrated embodiment, internal combustion engine system 10 (hereinafter "engine system 10") is a multi-cylinder spark-ignited design, including a plurality of cylinders 14 (described herein interchangeably with combustion chamber(s) 14), each having a piston 26 reciprocable therein in a generally conventional manner to rotate a crankshaft 28. The stream of gaseous fuel and air may be a so-called mine gas stream from a mine gas supply 30, such as might be produced by way of ventilation of a coal mine, or potentially another type of mine. The stream of gaseous fuel and air will typically be stoichiometrically lean, and commonly having a gaseous fuel content that is about 10% or less by volume, and potentially about 4% or less by volume. As used herein the term "about" can be understood in the context of conventional rounding to a consistent number of significant digits. Accordingly, "about 10" means from 5 to 14, and "about 4" means from 3.5 to 4.4, and so on. Other than a mine gas stream, the stream of gaseous fuel and air might be a variety of other known mixtures of gaseous fuel and air, such as a biogas stream, a landfill gas stream, or still another. In an implementation, the stream of gaseous fuel and air is conveyed into inlet 18, and thenceforth through a compressor 50 of a turbocharger 48, and then through an aftercooler 42. From aftercooler 42, the stream of gaseous fuel and air can be conveyed to an intake manifold 22, from which intake runners (not numbered) deliver the stream of gaseous fuel and air to individual cylinders 14. Exhaust is conveyed from cylinders 14 to an exhaust manifold 24, and thenceforth through a turbine 52 of turbocharger 48, and to an exhaust outlet 46. For purposes of the present disclosure, fluid conduit 16 can be understood as an entirety of the various fluid passages and chambers that extend from inlet 18 to outlet 46. Outlet 20 for conveying gaseous fuel and air into cylinders 14 can be understood as an outlet within fluid conduit 16.

Engine system 10 further includes a fuel system 34 including another fuel supply 32, which could include a supply of liquid natural gas (LNG), liquid propane (LP), pipeline natural gas, or still another form of fuel supply such as potentially a liquid fuel supply containing a diesel fuel. In an embodiment, fuel supply 32 includes a fuel tank 36, which could include a cryogenic fuel tank for storing liquefied gaseous fuel, and equipment 38 for vaporization and pressurization of liquefied fuel stored in fuel tank 36. An electronically controlled fuel valve 40 including an electrical actuator 41 may be provided and coupled between engine housing 12 and fuel supply 32 to convey a flow of augmenting fuel, such as any of the fuel types discussed above or other fuel types, from fuel supply 32 into the stream of gaseous fuel and air through fluid conduit 16. Electronically controlled fuel valve 40 (hereinafter valve 40) may include a fuel injector, such as a hydraulically actuated fuel injector, a mechanically actuated fuel injector, or an electrically actuated fuel injector, structured to inject augmenting fuel directly into the stream of gaseous fuel and air to form a combustion charge within engine housing 12. A location of delivery of augmenting fuel into the stream of gaseous fuel and air could be different from the location upstream compressor 50 that is depicted in FIG. 1. In other embodiments, the delivery or injection location could be downstream compressor 50, such as into intake manifold 22. In still other instances, the augmenting fuel could be injected directly into cylinders 14. It will be recalled that engine system 10 will typically be spark-ignited. To this end, a spark-ignition mechanism 44 may be associated with each of cylinders 14, and configured such that a spark gap is within each cylinder 14. In another construction, rather than a sparkplug alone, each of spark-ignition mechanisms 44 could include a spark-ignited prechamber ignition device, where the spark gap is located within a prechamber that is fluidly connected with the associated cylinder 14 in a generally known manner. In a prechamber ignition strategy conduits for conveying a flow of fuel from fuel supply 32 to each spark-ignition mechanism 44 could be provided. It can be appreciated that delivery of augmenting fuel to the stream of gaseous fuel and air will typically take place within engine housing 12 or within apparatus directly attached to engine housing 12.

Engine system 10 further includes a fuel quality sensing mechanism 54 structured to produce data indicative of an energy content of the stream of gaseous fuel and air. In FIG. 1, fuel quality sensing mechanism 54 is shown coupled with fluid conduit 16 at a location that is fluidly between a fuel delivery location provided by valve 40 and inlet 18. In other instances, fuel quality sensing mechanism 54 could be positioned upstream of inlet 18, in a flow of raw mine gas or the like supplied to engine system 10. Fuel quality sensing mechanism 54 may include at least one sensor exposed to a flow of the stream of gaseous fuel and air. The at least one sensor may include a calorimeter, structured to monitor a heating value, or a parameter having a known relationship with heating value, of the stream of gaseous fuel and air. In certain instances, factors such as Wobbe Index value and/or specific gravity, or BTU (British thermal units) of the stream of gaseous fuel and air could be determined directly or indirectly and exploited in the context of the present disclosure. In still other instances, a gas chromatograph could be used in the determination of or monitoring of energy contexts. It should also be appreciated that under at least certain conditions, the operation of an engine system itself, by way of factors such as engine speed, engine load, in-cylinder pressure and/or in-cylinder temperature, exhaust temperature, exhaust composition including but not limited to NOx content, or still other factors could be monitored to determine, estimate, or infer an energy content of a stream of gaseous fuel and air that is delivered to an engine system for combustion. Accordingly, rather than a sensor positioned within or exposed to a stream of gaseous fuel and air, embodiments are contemplated where the foregoing or other factors are monitored to obtain indirect measurements of energy content which can be acted upon in a manner further discussed herein.

Engine system 10 and/or fuel system 34 further includes a control system 35, that includes a control device 56 coupled with valve 40 and with fuel quality sensing mechanism 54. Control device 56 includes any suitable processor, microprocessor, field programmable gate array (FPGA), or other computerized device. Control device 56 may be structured to receive data produced by fuel quality sensing mechanism 54 that is indicative of an energy content of a stream of gaseous fuel and air. Fuel quality sensing mechanism 54 (hereinafter "sensing mechanism 54") may further produce data more or less continuously, or periodically, such that control device 56 receives the data continuously or periodically over time, such that the data may be indicative of a change in energy content of the stream of gaseous fuel and air from a first time to a second time. Depending upon the particular application, due to natural variation in natural gas amounts within a mine or the like, or potentially variations in operation of mine ventilation equipment, or for still other reasons, the relative amount of natural gas can vary in a manner that would affect operation of engine system 10 unless some compensation is performed.

Control device 56 may be further structured to vary an amount of the augmenting fuel that is injected into the stream of gaseous fuel and air from a first time to a second time, based on the data indicative of a change in energy content, such that operation of engine system 10 can continue uninterrupted and/or with minimal disruption. Those skilled in the art will be familiar with general strategies related to control of engine fueling based upon variation in or variation in demand for engine speed and engine load. Control system 35 may further include a load sensor 43 and an engine speed sensor 45 that are coupled with engine housing 12 to enable monitoring of engine load and engine speed, respectively. Engine speed sensor 45 may produce an engine speed signal, whereas engine load sensor 43 may produce an engine load signal. The manner of controlling fueling may, in some embodiments, be based on a charge density of the incoming mixture of gaseous fuel and air. To this end, control system 35 may further include a charge density sensing mechanism 58 that includes at least one sensor exposed to a flow of the stream of gaseous fuel and air coupled with control device 56. In an implementation, the at least one sensor includes a pressure sensor 60 and a temperature sensor 62 structured, respectively, to monitor pressure and temperature of the mixture of gaseous fuel and air within intake manifold 22. Measurements of pressure and temperature could be made elsewhere within engine system 10 in other instances to determine charge density.

Figure 2:
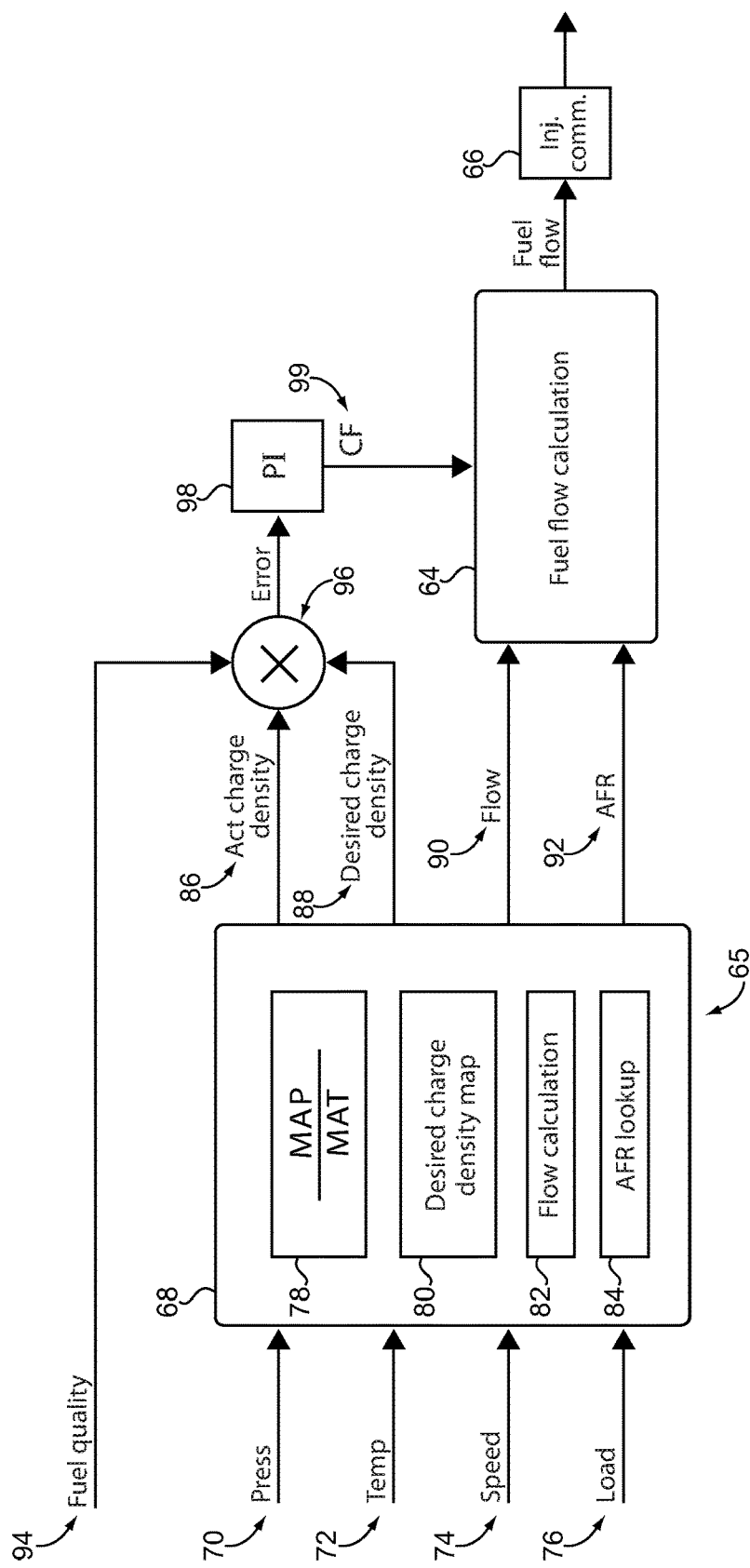
FIG. 2 is a block diagram of data processing and control calculations, according to one embodiment.

Turning now to FIG. 2, there is shown a block diagram 65 of data processing and calculations to produce a fuel flow amount that determines a fuel injector or fueling control command 66. Command 66 might be a command for a fuel injector actuation timing, or actuation duration, for instance, to controllably inject an amount of augmenting fuel as described herein, based on the data indicative of a change in energy content of the stream of gaseous fuel and air, and upon a difference between an actual charge density and a desired charge density of the stream of gaseous fuel and air. In diagram 65, a pressure signal 70, a temperature signal 72, an engine speed signal 74, and an engine load signal 76 are received for performing a number of calculations at a block 68.

At block 68, a first operation 78 includes calculating a quotient of manifold air pressure (MAP) and manifold air temperature (MAT). A second operation 80 includes looking up a desired charge density in a desired charge density map, a third operation 82 includes a flow calculation, and a fourth operation 84 includes an air-fuel ratio (AFR) lookup. At operation 82, the flow calculation can include looking up a volumetric efficiency for engine system 10 in a volumetric efficiency map. A volumetric efficiency determined from the map can be used in conjunction with pressure, temperature, and engine speed to determine an air flow or gaseous fuel and air flow 90 in a generally known manner.

The AFR lookup 84 can include determining an AFR output 92 based upon engine load and engine speed. An actual charge density 86 is determined from operation 78, and a desired charge density 88 determined from the charge density map lookup at operation 80. A calculation 96 produces an error term that is based on a difference between actual charge density 86 and desired charge density 88, and on data indicative of energy content as encoded in a fuel quality signal 94, such as from fuel quality sensing mechanism 54. The fuel quality signal will be understood to be or to encode the data indicative of energy content as described herein. The difference between actual charge density 86 and desired charge density 88 can be understood as a calculation that is indicative of an energy content difference. In other words, where actual charge density is greater than desired charge density, or less than desired charge density, the difference between the two can be understood as a difference in energy content. According to the present disclosure, an actual difference in energy content needs to also take account of the energy content in the stream of gaseous fuel and air. Accordingly, the calculation 96 can be understood as determining an error term that represents the extent to which energy content of the combustion charge formed of the gaseous fuel, air, and augmenting fuel, that is delivered to cylinders 14 for combustion should be adjusted. In this way it can be seen that control device 56 can calculate a correction factor 99 (CF) that is based on the error term, for use in fuel flow calculation 64. Control device 56 may further calculate CF 99 by applying a proportional gain in a PI controller 98 to the error term. Correction factor 99 can thus be used in the fuel flow calculation to produce a fuel flow output that serves as a basis for fuel injector control command 66. In one non-limiting embodiment, the fuel flow calculation could be according to the following equation, where mapped BTU and Actual BTU values refer to known or determinable properties of the gaseous fuel in the mine gas stream:

$$\frac{\text{AIR FLOW} \times \text{Mapped BTU} \times CF}{AFR \times \text{Actual BTU}} = \text{Fuel Flow}$$

INDUSTRIAL APPLICABILITY

Figure 3:
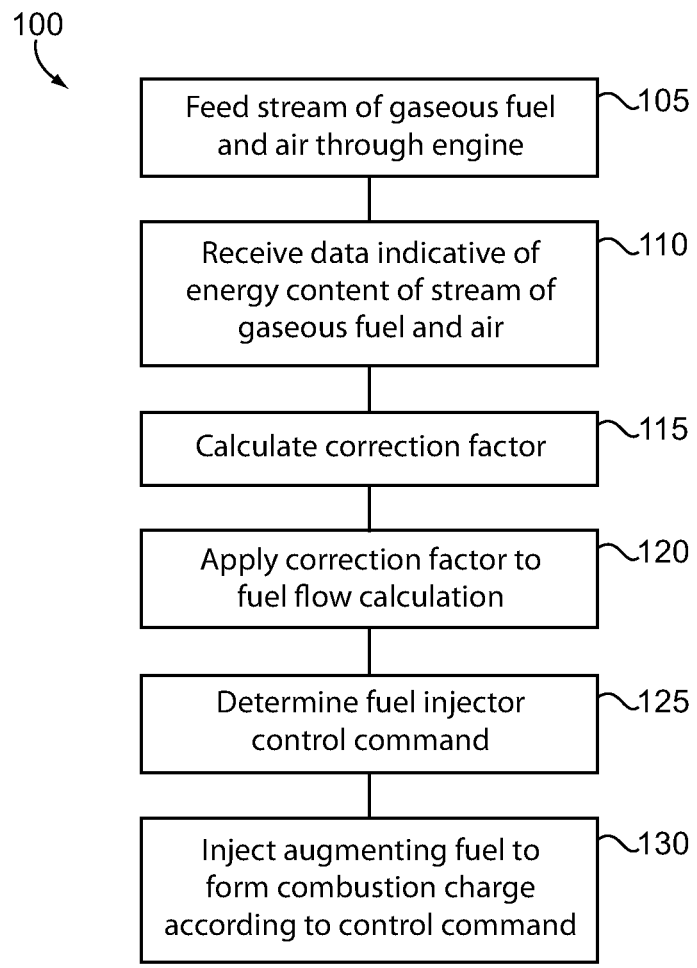
FIG. 3 is a flowchart illustrating example process and control logic flow, according to one embodiment.

Referring to the drawings generally, but in particular now to FIG. 3, there is shown a flowchart 100 illustrating example process and control logic flow, according to the present disclosure. At a block 105 the stream of gaseous fuel and air is fed through engine system 10, and the process may advance to block 110 to receive data indicative of energy content of the stream of gaseous fuel and air as described herein. From block 110, the process may advance to block 115 to calculate the correction factor, and then to block 120 to apply the correction factor to the fuel flow calculation. From block 120, the process may advance to block 125 to determine a fuel injector control command, for instance. From block 125, the process may advance to block 130 to inject the augmenting fuel to form a combustion charge according to the control command.

As described herein, the combustion charge contains the gaseous fuel, air, and an injected amount of the augmenting fuel that is dependent upon the energy content of the stream of gaseous fuel and air. Where the energy content of the stream of gaseous fuel and air is changing, an updated correction factor may be periodically calculated as control device 56 executes fuel injection and engine operating control logic. It will thus be appreciated that where energy content of the stream of gaseous fuel and air increases from a first time to a second time, control device 56 may calculate a fuel correction factor that results in an injection amount of the augmenting fuel being reduced from the first time to the second time. Where energy content of the stream of gaseous fuel and air decreases, the correction factor can cause an injection amount of the augmenting fuel to increase. In an embodiment, control device 56 may be structured to calculate a value of the correction factor such that an amount of the augmenting fuel injected is sufficient to increase a proportion of total fuel in the combustion charge from a first amount that is about 10% or less by volume to a second amount that is about 12% or less by volume.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. An internal combustion engine system comprising:
    an engine housing having a combustion chamber formed therein, and including a fluid conduit having an inlet for receiving a stream of gaseous fuel and air, and an outlet for conveying the stream of gaseous fuel and air to the combustion chamber;
    a fuel supply;
    an electronically controlled fuel valve positioned fluidly between the fluid conduit and the fuel supply to convey a flow of augmenting fuel from the fuel supply for injection into the stream of gaseous fuel and air at a location downstream of the inlet;
    a fuel quality sensing mechanism structured to produce data indicative of an energy content of the stream of gaseous fuel and air and including at least one sensor exposed to a flow of the stream of gaseous fuel and air at a location downstream of the inlet and upstream of the location of injection of the augmenting fuel; and
    a control device coupled with the electronically controlled fuel valve and with the fuel quality sensing mechanism, and the control device being structured to:
        actuate the electronically controlled fuel valve to form a combustion charge within the engine housing that contains the gaseous fuel, air, and an injected amount of the augmenting fuel that is dependent upon the energy content of the stream of gaseous fuel and air;
        determine a correction factor that is based on the data indicative of energy content; and
        perform the actuation of the electronically controlled fuel valve by way of outputting a fueling control command that is based on the correction factor.

2. The engine system of claim 1 wherein the fluid conduit includes an intake conduit extending between a compressor and a cylinder forming the combustion chamber in the engine housing, and further comprising a spark-ignition mechanism in fluid communication with the cylinder.

3. The engine system of claim 1 wherein the at least one sensor includes a calorimeter.

4. The engine system of claim 1 further comprising a density sensing mechanism including at least one sensor exposed to a flow of the stream of gaseous fuel and air, and wherein the control device is further structured to determine the correction factor based on data produced by the density sensing mechanism.

5. The engine system of claim 4 wherein the control device is further structured to calculate an error term that is based on, a difference between an actual density indicated by the data and a desired density, and the data indicative of energy content, and to calculate the correction factor based on the error term.

6. The engine system of claim 5 wherein the control device is further structured to calculate the correction factor by applying a proportional gain to the error term.

7. A fuel system for an internal combustion engine comprising:
    a fluid conduit having an inlet for receiving a stream of gaseous fuel and air, and an outlet structured to fluidly connect to a combustion chamber in the internal combustion engine;
    a fuel supply;
    an electronically controlled fuel valve in fluid communication with the fuel supply and structured to inject an augmenting fuel from the fuel supply into the stream of gaseous fuel and air at a location downstream of the inlet to form a combustion charge within the internal combustion engine;
    a fuel quality sensing mechanism including at least one sensor exposed to a flow of the stream of gaseous fuel and air at a location downstream of the inlet and upstream of the location of injection of the augmenting fuel; and
    a control device coupled with the electronically controlled fuel valve and with the fuel quality sensing mechanism, the control device being structured to:
        receive data produced by the fuel quality sensing mechanism that is indicative of a change in energy content of the stream of gaseous fuel and air from a first time to a second time;
        vary an amount of the augmenting fuel that is injected into the stream of gaseous fuel and air from the first time to the second time, based on the data indicative of a change in energy content; and
        perform the varying of the amount of the augmenting fuel that is injected by determining a correction factor based on the data indicative of a change in energy content.

8. The fuel system of claim 7 wherein the fuel quality sensing mechanism includes a calorimeter exposed to a flow of the stream of gaseous fuel and air.

9. The fuel system of claim 8 further comprising a density sensing mechanism including at least one sensor exposed to a flow of the stream of gaseous fuel and air and coupled with the control device.

10. The fuel system of claim 8 wherein the control device is further structured to vary the amount of the augmenting fuel that is injected based upon a difference between an actual density and a desired density of the stream of gaseous fuel and air.

11. The fuel system of claim 10 wherein the control device is further structured to determine the correction factor based on the difference between an actual density and a desired density, and determine a fueling control command based on the correction factor.

12. The fuel system of claim 11 wherein the control device is further structured to calculate a value of the correction factor such that an amount of the augmenting fuel injected is sufficient to increase a proportion of total fuel in the charge from a first amount that is about 10% or less by volume to a second amount that is about 12% or less by volume.

13. A control system for a spark-ignited gaseous fuel internal combustion engine system comprising:
- a fuel quality sensing mechanism structured to couple with a fluid conduit for conveying a stream containing gaseous fuel and air through the internal combustion engine, such that the fuel quality sensing mechanism is exposed to a flow of the stream of gaseous fuel and air;
- a density sensing mechanism structured to couple with the fluid conduit at a location downstream of the fuel quality sensing mechanism;
- a control device coupled with the fuel quality sensing mechanism, and being structured to couple with a fuel valve for injecting the augmenting fuel into the stream of gaseous fuel and air to increase an energy content of the stream of gaseous fuel and air, the control device being further structured to:
  - receive data produced by the fuel quality sensing mechanism that is indicative of a change in energy content of the stream of gaseous fuel and air from a first time to a second time;
  - receive data produced by the density sensing mechanism that is indicative of a density of the stream of gaseous fuel and air;
  - determine a correction factor that is based on the data indicative of a change in energy content and the data indicative of density of the stream of gaseous fuel and air; and
  - vary an amount of the augmenting fuel that is injected into the stream of gaseous fuel and air from the first time to the second time, based on the correction factor.

14. The control system of claim 13 wherein the data indicative of a change in energy content includes data indicative of the energy content at the first time and data indicative of the energy content at the second time, and wherein the control device is further structured to determine the correction factor based on the data indicative of energy content at the second time, and to vary the amount of the augmenting fuel that is injected by way of outputting a fueling control command that is based on the correction factor.

15. The control system of claim 13 wherein the control device is further structured to calculate an error term that is based on, a difference between an actual density and a desired density, and the energy content, and to calculate the correction factor based on the error term.

16. The control system of claim 15 wherein the fuel quality sensing mechanism includes a calorimeter.

17. The control system of claim 15 wherein the control device is further structured to calculate a value of the correction factor such that an amount of the augmenting fuel injected is sufficient to increase a proportion of total fuel in the charge from a first amount that is about 10% or less by volume to a second amount that is about 12% or less by volume.

* * * * *